(12) United States Patent
Barkan

(10) Patent No.: US 12,034,765 B1
(45) Date of Patent: Jul. 9, 2024

(54) SECURING NETWORK ACCESS WITH LEGACY COMPUTERS

(71) Applicant: Mordecai Barkan, Palo Alto, CA (US)

(72) Inventor: Mordecai Barkan, Palo Alto, CA (US)

( * ) Notice: Subject to any disclaimer, the term of this patent is extended or adjusted under 35 U.S.C. 154(b) by 0 days.

(21) Appl. No.: 18/387,051

(22) Filed: Nov. 5, 2023

Related U.S. Application Data

(60) Provisional application No. 63/528,582, filed on Jul. 24, 2023.

(51) Int. Cl.
*H04L 9/40* (2022.01)
(52) U.S. Cl.
CPC ........ *H04L 63/145* (2013.01); *H04L 63/0428* (2013.01); *H04L 63/1475* (2013.01)
(58) Field of Classification Search
CPC .............. H04L 63/145; H04L 63/0428; H04L 63/1475
USPC ........................................ 726/23, 22, 24–25
See application file for complete search history.

(56) References Cited

U.S. PATENT DOCUMENTS

| | | | | |
|---|---|---|---|---|
| 10,218,738 B2* | 2/2019 | O'Reirdan | ............ | G06F 21/554 |
| 10,333,973 B1* | 6/2019 | Hewitt | ............ | H04L 63/08 |
| 10,728,276 B1* | 7/2020 | Benskin | ............ | H04L 63/145 |
| 10,798,123 B2* | 10/2020 | Bingham | ............ | G06F 16/954 |
| 11,075,886 B2* | 7/2021 | Paul | ............ | H04L 63/0471 |
| 11,303,672 B2* | 4/2022 | Finkelshtein | ............ | H04L 63/0838 |
| 11,552,987 B2* | 1/2023 | Martz | ............ | H04L 63/145 |
| 11,647,044 B1* | 5/2023 | Voutour | ............ | G06F 21/31 715/780 |
| 2010/0205676 A1* | 8/2010 | Kencl | ............ | G06F 21/6254 726/26 |
| 2012/0084566 A1* | 4/2012 | Chin | ............ | H04L 63/10 713/168 |
| 2016/0323314 A1* | 11/2016 | Reddington | ............ | H04L 63/1483 |
| 2019/0386827 A1* | 12/2019 | Stanley | ............ | G06F 21/602 |

* cited by examiner

*Primary Examiner* — Amare F Tabor

(57) ABSTRACT

Off-the-shelf computing systems, even in the presence of malware infecting those computing systems, are used to access securely other network computing systems—Secured sites. The use may take shape in various ways and the potential use of two, three, or more computing systems is described. The use in a malware-infected environment is advantageous and exposes hacking attempts in real-time.

7 Claims, 9 Drawing Sheets

SECURING NETWORK ACCESS WITH LEGACY COMPUTERS

CROSS-REFERENCE TO RELATED APPLICATIONS

This non-provisional patent application claims benefit to U.S. Provisional Application No. 63/528,582, filed Jul. 24, 2023.

BACKGROUND

1. Field of the Technology

The field of the invention is authentication and access management.

2. Description of the Related Art

There are numerous attempts to secure the authentication process and access management. Those attempts are made by utilizing means of the legacy architecture, adding elements that share the central bus and system components, and sharing resources of input and output devices. Those attempts are also made by elements of the network accessed by the legacy system—mainly software means that when implemented for the internet environment are referred to as cloud means.

The situation is that infection by malware cannot be avoided. The architecture of computing systems, and the complexity of the software, combined with human nature leads to this state of affairs. Updates of software or adding hardware elements to the SAME BASIC VAN NEWMANN architecture are adding to the vulnerability of the computing system.

Solutions to the challenge of protecting user information—contrary to the legacy approach that focuses on protecting the computing system and detection of malware—by adding hardware means are feasible.

The innovation presented here will allow the secure and safe use of off-the-shelf Legacy computing systems such as smartphones, laptops, PCs, servers, and watches ... that are vulnerable to infection by malware.

SUMMARY OF THE DISCLOSURE

According to some embodiments, the present technology is directed to a system, comprising: (a) Tow legacy environments comprising an off-the-shelf computing system, such as smartphones, laptops, PCs, servers, and watches ... connected to a network; (b) a secured program (internet site or a network edge computing-system/server) that provide services to the user of the two legacy computing systems or serves as a proxy to other.

A user communicates with the network utilizing the two Legacy computers on the site that support the security functions.

In its simplest form, assuming that the computers connect to the network with an established browser, no modifications are required to the Legacy computing systems. The user follows a protocol to assure secure and safe access to the internet, supporting such functions as authentication.

The invention allows for the protection—security, safety, and privacy—of a user of malware-infected legacy computing systems from divulging sensitive information that risks the user and may cause him damage.

According to other embodiments, the present technology is directed to a system, comprising: (a) a mobile computing device; and (b) a computing device. Both systems are configured to communicate with a network directly. The second computing device not accessing user-sensitive information created and sent by the mobile computing device, is regarded as trusted, preventing the second computing device from executing a malicious attack.

A Secured site supports the secured communication of the user of the combined mobile and second computing devices to the Secured site or sites serviced via the secured site.

Using terms of systems and devices as referred to computing are interchangeable.

The user communicates to the Secured site, utilizing the two computing devices, securely employing an innovative protocol

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that can be readily apparent to those of ordinary skill in the art having the benefit of the description herein.

In the following the subject of this innovation, a hardware computing device could be referred to as a trusted device, trusted environment, trusted component, or integrated trusted computing device.

Legacy systems may be also referred to as legacy environments or legacy computing systems.

Figure 1:
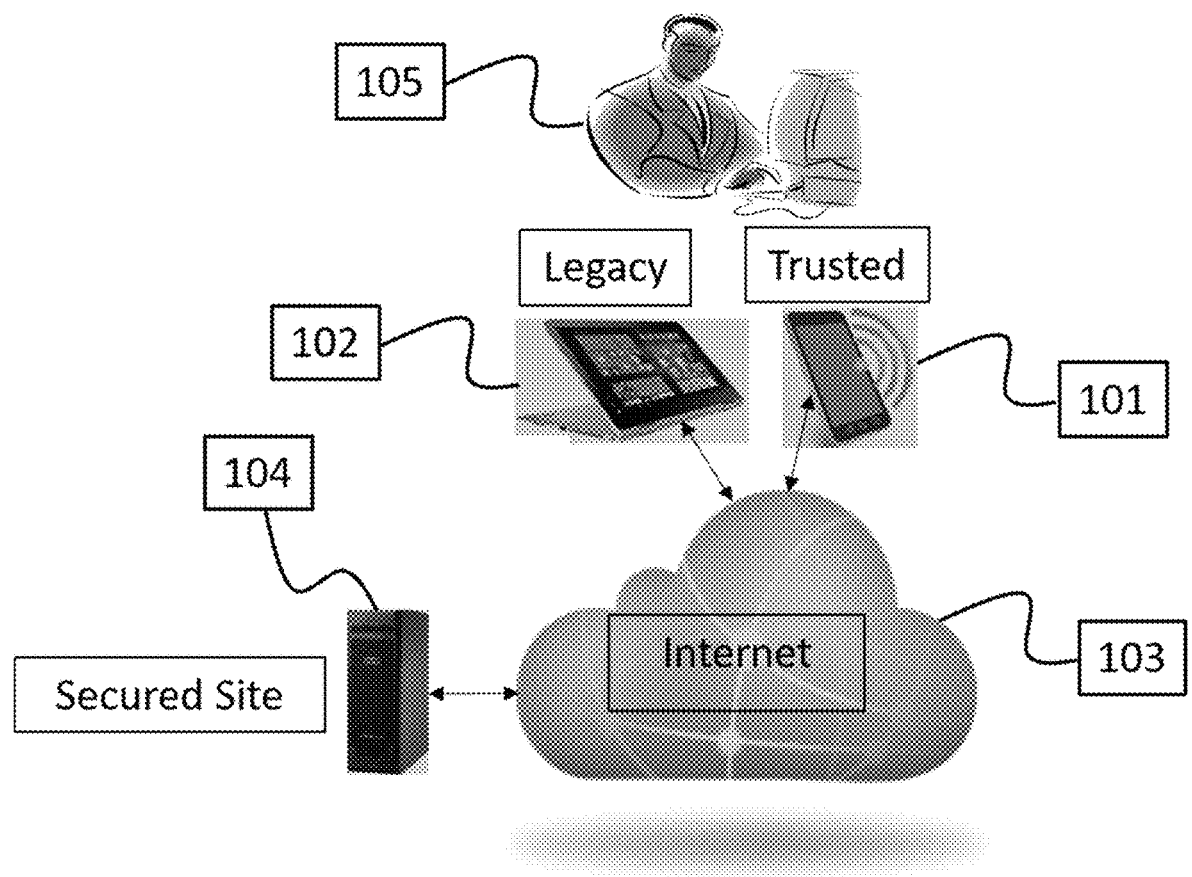

FIG. 1 depicts an exemplary configuration of the innovation

Figure 2:
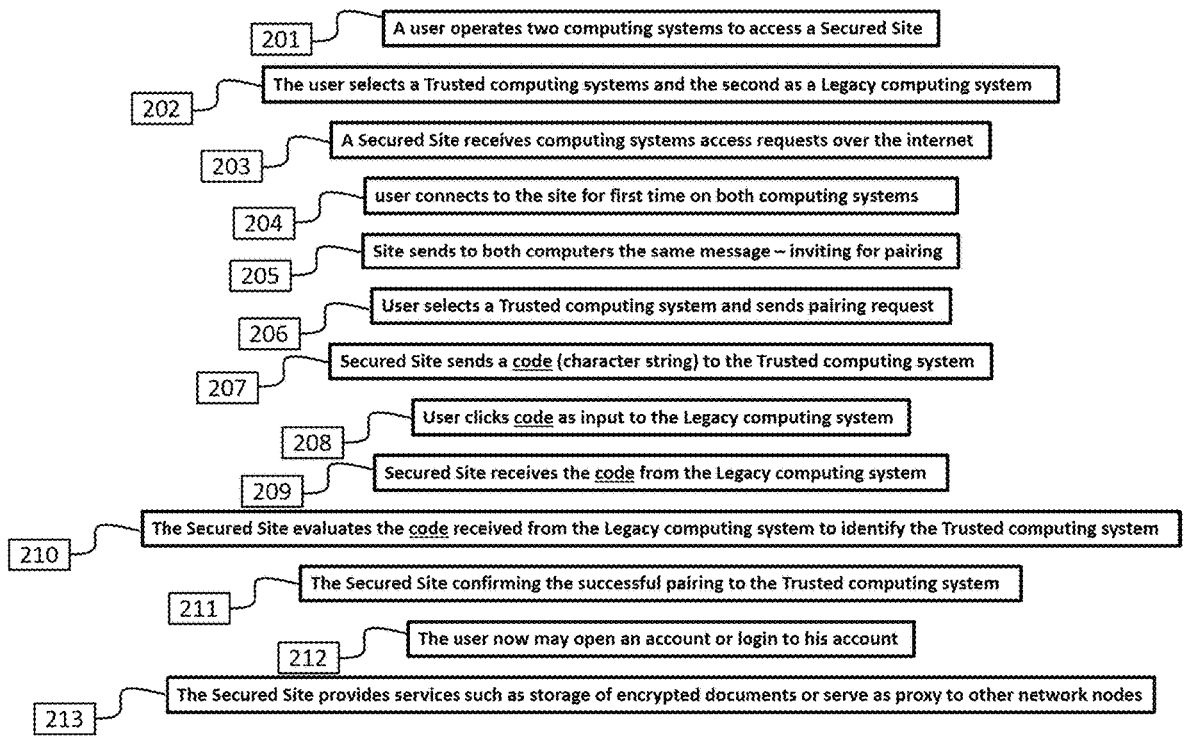

FIG. 2 Sequence of events establishing the communication channels

Figure 3:
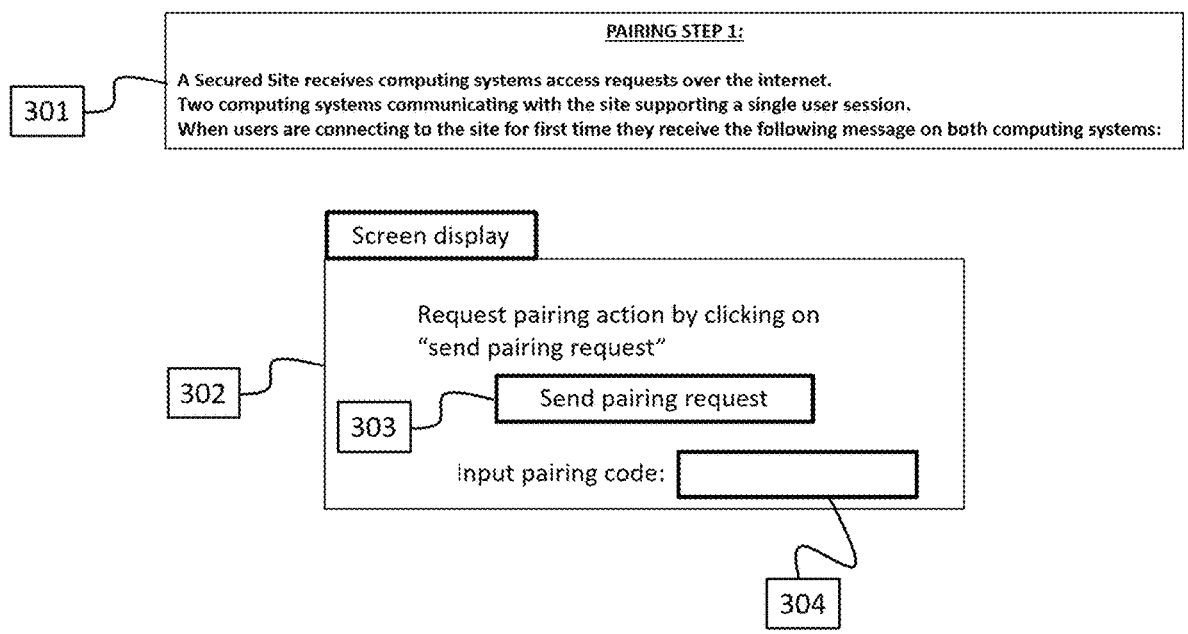

FIG. 3 Depicts the computer screens for Step 1 of pairing

Figure 4:
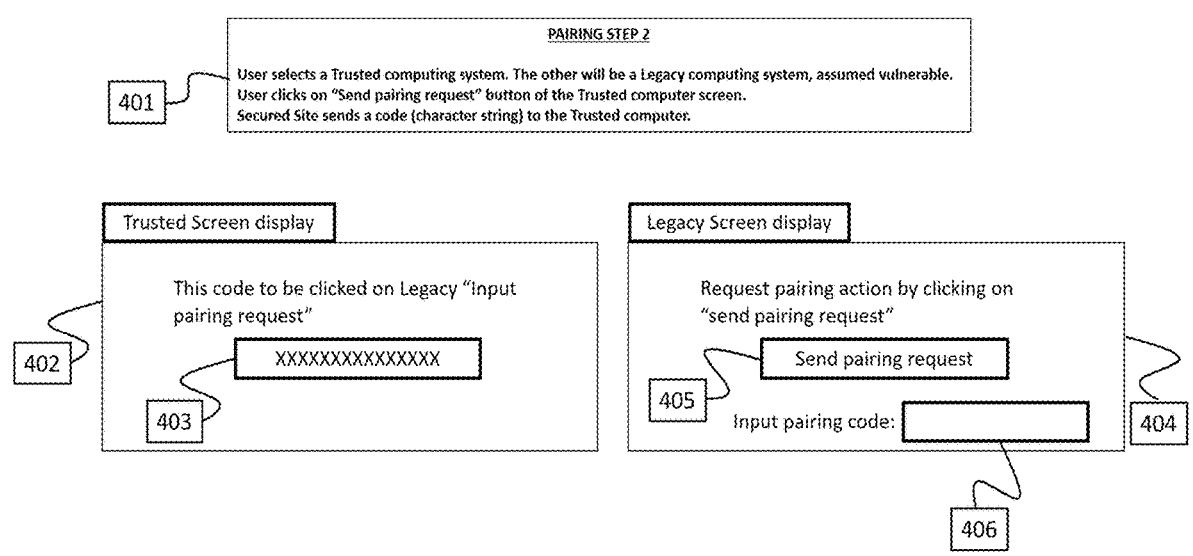

FIG. 4 depicts the computer screens for Step 2 of the pairing

Figure 5:
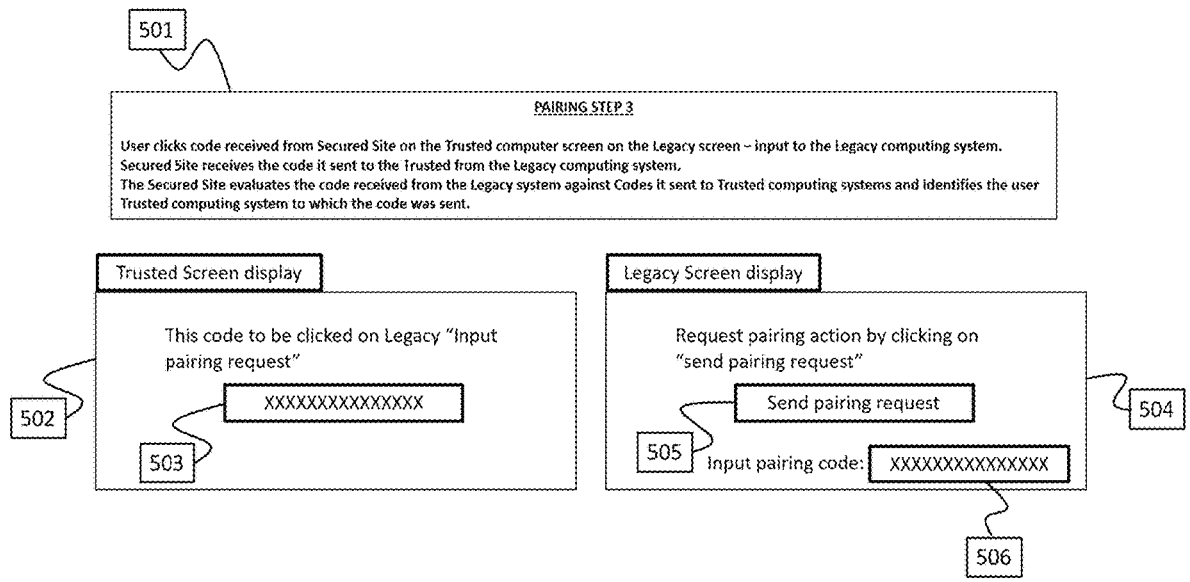

FIG. 5 depicts the computer screens for Step 3 of the pairing

Figure 6:
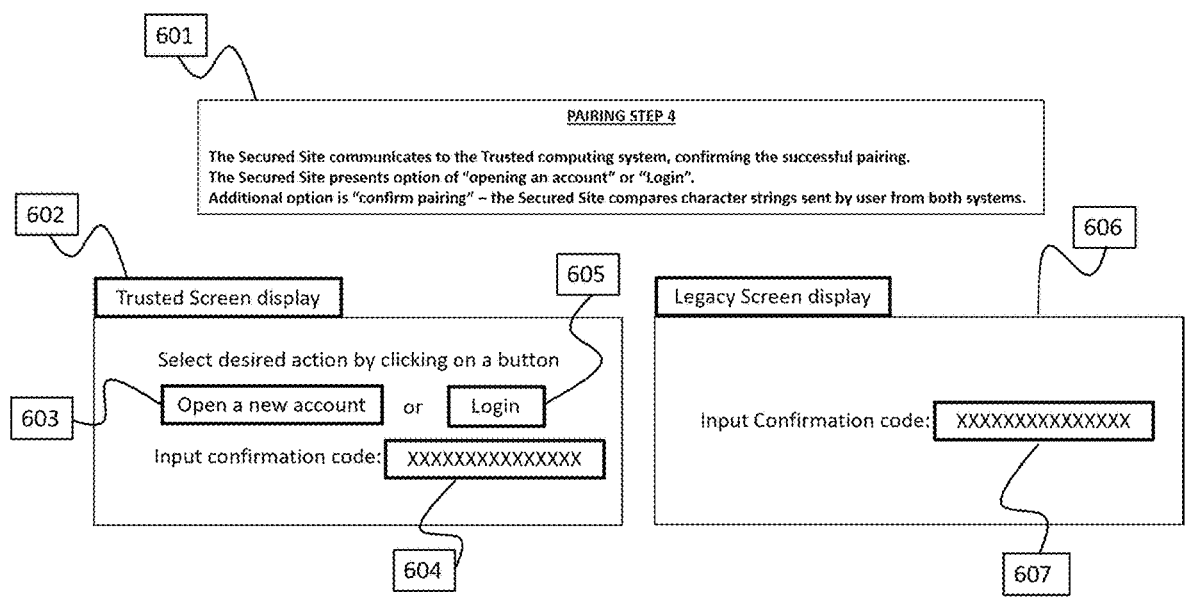

FIG. 6 depicts the computer screens for Step 4 of the pairing

Figure 7:
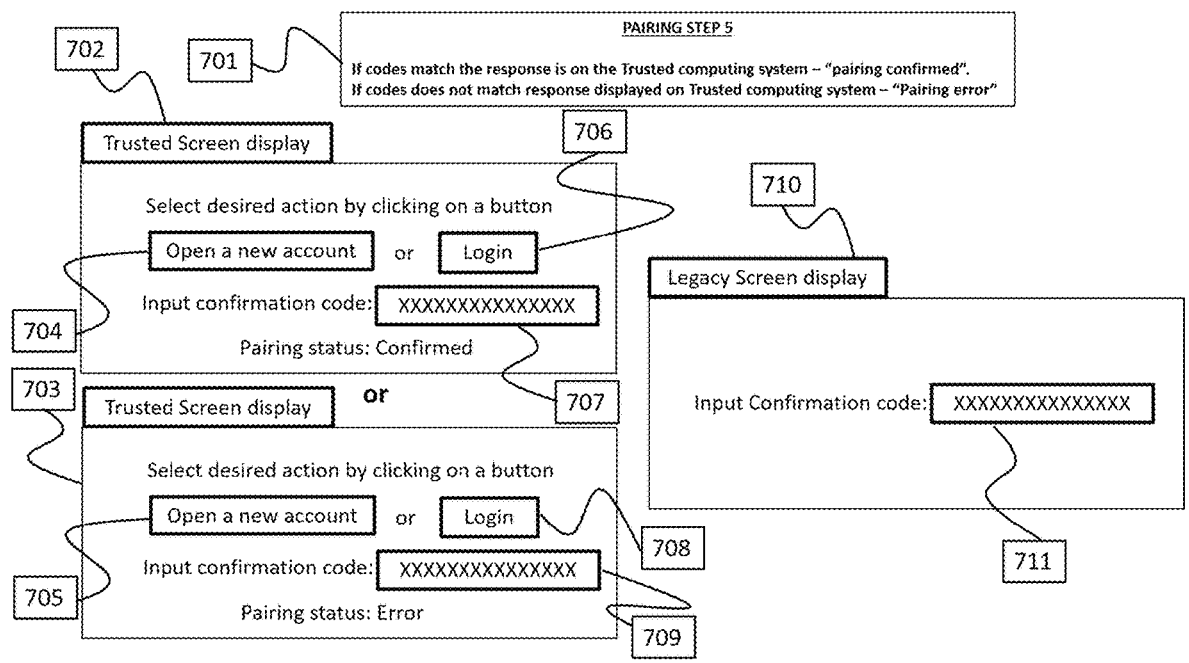

FIG. 7 Depicts the computer screens for Step 5 of pairing

Figure 8:
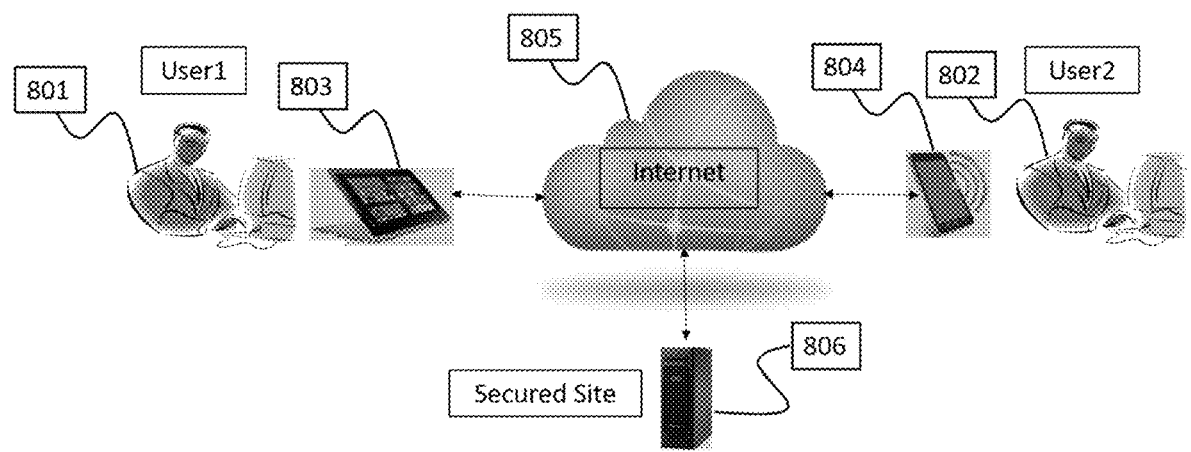

FIG. 8 depicts a configuration linking securely two users

Figure 9:
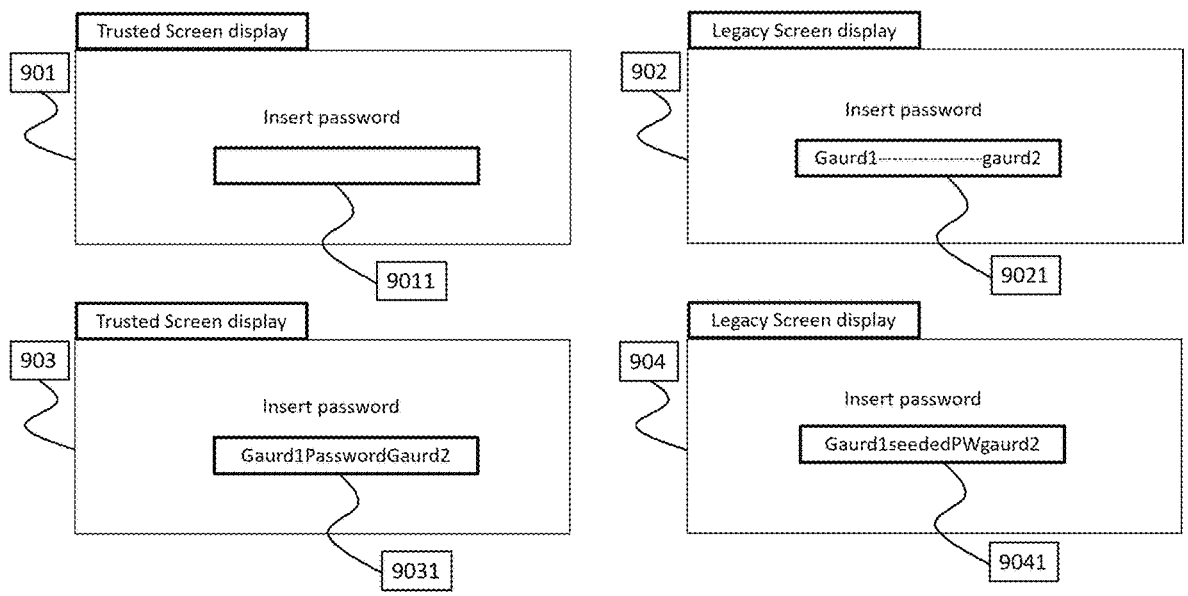

FIG. 9 Presents screens of an embodiment that secures authentication when two computing systems are infected with malware.

DETAILED DESCRIPTION

FIG. 1 depicts the exemplary configuration of the innovation;

User 105 connects to the network (internet 103) utilizing two computing devices—a smartphone 101 and a notebook 102. The Smartphone 101 is assumed to be less vulnerable to malware infection and thus regarded as Trusted. The Notebook 102, as more vulnerable to malware infection, will be regarded as a Legacy.

The user 105 communicates with the internet 103 Secured Site 104 utilizing the two computing devices Trusted smartphone 101 and Legacy notebook 102.

By the use of two computing systems user 105 is utilizing the secured out-of-band channel supported by the Trusted smartphone 101 (exemplary of a computing system) to protect sensitive information sent to the Secured site 104 to avoid access to the Legacy notebook 102 (exemplary of a computing system) to such information.

It is possible to support secure operations even if the user 105 computing systems are infected with malware by manipulation of messages.

It should be understood by persons skilled in the art that more computing systems may be used by the user 105 simultaneously to communicate to a Secured site 104.

The user 105 may communicate by those out-of-band means to multiple Secured sites 102.

The Secured site 104 may be organized as multiple sites, taking advantage of redirecting to allow enhanced security of the Secured site 104, a challenge to allow secured user 105 operations.

The Secured Site 104 will support various functions related to securing the user 105 communication with the Secured Site 104:
1. Secured access management
2. Secured site 104 services for user
3. Secured site 104 serves as a proxy to other Internet 103 sites Following is a description of these functions of Secured Site 104.

1. Secured Access Management

Several functions are supported by the Secured site 105:

1.1 Pairing—process for recognizing the Trusted Smartphone 101 and the Legacy Notebook 102 as a pair of computing systems. This function may be expanded to support more than two computing systems used by the user 105.

1.2 Authentication—any computing system, smartphone 101 or notebook 102, may be used by the user to open an account on the Secured site—ID, and password. Multiple factor authentication, such as biometrics, and tokens . . . , could be implemented—persons skilled in the art will have no problem in applying such means.

1.3 Manage various databases such as paired computing systems, non-paired computing systems, accounts—ID and passwords, and seeded passwords . . . . Each includes additional information such as source, date . . . .

2. Secured Site 104 Services for User

Various services may be supported by the Secured site 104:

2.1 Store user 105 files as plain or encrypted
2.2 Email system
2.3 Running applications, such as word processors, Excel, PowerPoint
2.4 Two or more users secure communication: Texting, audio, video A person skilled in the art could apply other services such as finding the fit to benefit from the secure operation of the Secured site 104.

3. Secured Site 104 Serves as a Proxy to Other Internet 103 Sites

Other sites of the internet 103 (or network) may be accessed by the Secured site 104 which acts as a remote PC (Personal Computer) for the user 105.

The Secured site 104, as a proxy, allows user 105 to access other sites utilizing a browser.

The Secured Site 104 parse the information received from other sites and sends selected information to the Trusted Smartphone 101 or the Legacy Notebook 102.

The Secured site 104 receives information from both users' computing systems, Trusted 101 and Legacy 102.

User 105 follows an accepted protocol to assure the protection of sensitive information. Though the Trusted Smartphone 101 is regarded as trusted a method is suggested to allow secure communication even in the presence of malware.

Worth noting that the Secured site 104 is protected from malware in the computing systems of the user 105, the Trusted computing system 101, and the Legacy computing system 102.

Further hardening and securing may be achieved by limiting the functionality of the Secured site 104 and redirecting access to other servers as found fit.

A person skilled in the art could envision various ways to implement such protection once the basic concept is divulged in later discussion.

FIG. 2 outlines detailed steps to operate the configuration of two computing systems, Trusted 101 and Legacy 102, presented in FIG. 1.

201—a user operates two off-the-shelf computing systems

202—the user selects a computing system he believes is less vulnerable to malware infection as a Trusted computing system 101. The vulnerable computing system will be operated as the Legacy computing system 102.

203—the Secured site 104 is accessed by computing systems over the internet 103

204—user 105 connects to the site with both Trusted 101 and Legacy 102 computing systems.

205—the Secured site 104 sends to both user 105 computing systems, Trusted 101 and Legacy 102, the same message invitation of pairing 206—user 105 sends utilizing the selected Trusted computing system 101 a pairing request to the Secured site 104

207—the Secured site 104 response with a code (character string) sent to be displayed on the Trusted Computing System 101 screen for user 105.

208—user 105 keys code into the Legacy computing system 102.

209—Legacy computing system 102 communicates the code to the Secured site 104.

210—the Secured site 104 evaluates the code received from Legacy computing system 102 against codes sent to Trusted computing systems 101, and the one used by user 105 is identified 211—the Secured site 104 confirms successful pairing by a message sent to the user 105 to be displayed on the Trusted computing system 101 screens.

212—user 105 can now open an account or log in to an account he opened on the Secured site 104

213—after the successful setting of an account by user 105 on the Secured site 104 the site may provide services to user 105 or communicate utilizing the Secured site 104 as a proxy to services of another internet 103 sites The above is just an exemplary flow that may be modified or adapted to specific requirements or preferences of a person skilled in the art of implementing such configuration to secure communication to a network (the internet as an example).

In the following discussion an embodiment, one of various possible, of the pairing is presented for the pairing function. Though functions of pairing were presented in prior art what is unique here is the specific pairing of two systems to be used by the same user 105

FIG. 3 depicts the first step in the pairing as described in 301: Secured site 104 is accessed by two computing systems. At this stage, Secured Site 104 is not distinguishing these two computers from the other networked computing systems.

The Secured site 104 sends to both computers a page that is displayed as screen 302.

The page sent by the Secured site 104 contains button 303 and a field to input pairing code 304.

User 105 will key button 303 on the selected Trusted computing system 101 to send a pairing request to the Secured site 104, identifying the Trusted computing system 101 for the Secured site 104.

FIG. 4 depicts the second step of the pairing—described in 401: the user picks the Trusted computing system 101 to receive a pairing code from the Secured site 104.

When the Secured site 104 receives a pairing request, it generates a code that is sent to the Trusted computing system 101. Screen 402 is presented to user 105 with code in field 403.

At the same time, the other computing system becomes a Legacy computing system 102 that needs to be recognized as such by the Secured site 104.

FIG. 5 depicts the third step of the pairing phase as described in 501: The user keys the code into the Legacy computing system 102

The code sent by the Secured site is displayed on the Trusted computer system 101 screens 502 in the field 503.

User 105 inputs the code from field 503 into the displayed screen 504 of the Legacy computing system 102, into the field 506, and then uses button 505 to send the response code to the Secured site 104.

The Secured site 104 then evaluates the received code against the codes sent to the Trusted computing systems of the network and identifies the Trusted computing system 101 that matches the Legacy computing system 102 that communicated the same code to the Secured site 104.

FIG. 6 depicts the final stage of pairing 601: confirming successful pairing and enabling services of the site by accessing a user 105 account.

On the Trusted screen 602 of the Trusted computing system 101 buttons for "open a new account" 603 or button "Login" 605 allow users to access services provided by the Secured site 104.

The field 604 allows for confirmation of the pairing—when a character string is sent by the Secured site 104 to the Trusted computing system 101, it will be keyed by user 105 to the Legacy computing system screen 606 inside the field 607, confirming the pairing.

FIG. 7 further clarifies the confirming process 701.

Trusted computing system display 702 depicts the pairing status: Confirmed if the character string displayed in field 707 is identical to the one keyed in 711.

Trusted computing system display 703 depicts the pairing status: Error if the character string of field 709 does not match the one keyed by user 105 into field 711.

The above is just a preferred embodiment for some applications of the innovation. A person skilled in the art could envision other implementations based on specific requirements and needs to support secure communication.

Since more than two systems may be paired simultaneously, various methods and techniques may be implemented to support more than two systems for communication and support of a single user session and confirmation of pairing.

FIG. 8 is a simple extension of the concept that allows the pairing of two computing systems that are not collocated and used by two users.

User 1 801 utilizing a laptop 803, exemplary for any computing system—such as PC, smartphone, watch . . . , communicates with user 2 802 utilizing a smartphone 804, exemplary for any computing system—such as PC, laptop, watch . . . , over the internet (exemplary of a network) 805.

The Secured site 806 serves as a proxy and supports authentication of both users, 801 and 802.

It is possible that each user, 801 and/or 802, takes advantage of a two-computing system to securely connect to the Secured site 806.

FIG. 9 depicts a possible method to authenticate a user even when both computing systems, Trusted computing system 101 and Legacy computing system 102, are infected by malware.

It is emphasized that the concept as presented in this specific embodiment may take various shapes as envisioned by a person skilled in the art.

Some variations will be discussed later to clarify how such uses of the concept may be realized.

To further hardened the process and secure it more than two computing systems may be paired for simultaneous use.

Though the example depicted in FIG. 9 is focusing on password protection it should be understood that the password may be replaced by numerous other pieces of information—account ID, credit card, SS number, encryption codes, email addresses, file names . . . .

More sophisticated techniques could be used to deliver secure documents, images, video, and audio . . . by applying processes that allow human understanding while defeating malware or making it extremely complicated for malware to understand protected content.

First, the detailed description of FIG. 9 will be discussed followed by other options of use of the basic concept to allow persons skilled in the art to further add implementations that are obvious based on the explanation provided here.

The focus of the description in FIG. 9 is password protected to support a safe and secured authentication of a user 105 communicating to the Secured server 104.

The Secured site 104 sends to Trusted computing system 101 the page Trusted screen 901 with a field 9011 to "insert password".

The Secured site 104 sends to Legacy computing system 102 the page Legacy screen 902 with a field 9021 to "insert password" between the Gaurd1 and Guard2 characters string, replacing the dashed line.

User 105 inserts the "password" in field 9031 of the Trusted screen 903, which includes the additional character string from the Legacy screen 902 field 9021—"Gaurd1PasswordGuard2"—this way the real password is not revealed to malware infecting the Trusted computing system 101.

It should be clear that the Password may be replaced with any sensitive text/character-string. The process of such insertion may be referred to as masking and in general terms such insertion of sensitive information is also called "sensitive information integrated with mask".

User 105 inserts a fake password in field 9041 of the Legacy screen 904 replacing the dashed line of field 9021—"GaurdseededPWGaurd2—this will mislead malware infecting the Legacy computing system 102 to copy the seededPW, assuming that this is the real password.

The two passwords Guard1passwordGuard2 and seededPW are communicated to the Secured site 104 which expects to get the actual user password with the prefix Guard1 and suffix Guard2.

The Secured site 104 authenticates the user by recognizing the "Guarded" password.

By keeping copies of the Guard1passwordGuard2 and seededPW, the Secured site could identify hacking attempts and the source of malware—the use of Guard1passwordGuard2 will indicate Trusted computing system 101 infection by malware. Use of seededPW will indicate infection of the Legacy computing system 102.

As emphasized above, this is just an exemplary implementation. Following are additional examples of how the innovative protection of terms may be used.

The first extension is to the protection of other information—not only passwords. The password may be replaced by—an account ID, credit card number, SS number, encryption code, or email address, . . . .

Since the invention is not limited to the specific protocol as defined above, more guard character strings such as Guard1 or Guard2 may be used (3, 4 . . . ) the structure may involve a complex structure to be used and allow hiding a full document.

A third computing system may be paired to the Secured site 104 and used to communicate the mode of operation—the information protected and the means used to protect it, such as several guarding character strings.

Any person skilled in the art could further modify and add complexities—if by various protocols or additional computing systems or other means to be paired.

Since a session may involve various actions it might be that for the initial phase, three computer systems will be used and that the session will carry on only with two.

A person skilled in the art could envision other implementations as may fit specific needs and security requirements.

By the use of additional techniques to defeat malware—text messages, documents, images, video, audio . . . may be altered in ways understood and properly interpreted by the user 105 and not divulge information to malware infecting the computing systems.

To clarify the above statement examples of the challenge of defeating malware are presented in more detail.

First challenge—assuming that the two computing systems used by user 105, Trusted computing system 101 and Legacy computing system 102, are communicating or have a hacker remotely accessing the computing systems.

To overcome such a challenge a prior setup is made in which the user 105 uses various masks and combination with password modifications.

For example: in the first session user 105 is replacing the first 6 characters of the password with Guard1. In the following session, Guard2 replaces the last 6 characters of the password.

The masks could be more than two and the way used by the user may be not as copy—for example, Guard1 presented in one system may be typed as 1rudaG to replace the first 6 characters of the password or only the first 3 characters.

By changing the rules from session to session the malware/hackers will be tempted to test the water—meaning attempting access to guess the password. By accurately following the messages from the computing systems, the infected computers will be detected as the source of the messages used.

It is well understood that this way not only passwords may be protected. Other sensitive information may be secured and actually by implementing a different technique for each such communication, malware/hackers will be confused.

For example, a credit card will be protected by utilizing masks that contain numbers. Since those values are fixed the numbers may be modified in a certain modified way which is clear to user 105 but disguising the actual number from malware/hacker. Here the user may be needing to modify certain values when copying from Legacy to Trusted. The masks may include some of the credit card numbers.

Examples of such sensitive information to be protected may include—SS numbers, email addresses, account IDs, URLs, encryption/decryption codes, various passwords, text messages . . . .

To further enhance security a third computing system, which is kept from connecting to the other computing systems, modes of operation may communicate with the Secured site 104. This computer will be paired with the other two systems, allowing the user to take advantage of the three communication links to Secured Site 104.

General Discussion and Examples

1. Splitting Session Information

Key to using two computing systems (or more) is the way information is presented or retrieved by a user of the computing systems—it is split between the two computing systems during the sessions to avoid malware infecting any of the systems from revealing a full knowledge about the information exchange with a Secured site.

For example—using one system—Legacy—to display (or voice) information from the Secured site, in-bound-information, to the user and the user response or action utilizing another computing system—Trusted—to the Secured site.

The session details may be masked and secured by altering the information exchange in a controlled method. More details of the example:

Request for action or data is displayed on the Legacy computing system (it is emphasized that the selection of terms Legacy and Trusted is arbitrary for convenience of discussion. A person skilled in the art will understand it and will select his preference of naming), assuming a request to key sensitive information such as password, ID, account #, credit card, SS #, encryption code, . . . to be inserted in a field of the Legacy display. The assumption is that malware is infecting the Legacy computing system.

The user response on the Trusted computing system is in a field with a name to mislead malware infecting the Trusted computing system.

The legacy computing system may be a Legacy system or just a Legacy.

The trusted computing system may be a Trusted system or just Trusted.

For example, the request for a password will be displayed on the Legacy computing system with a field to "insert password". The Trusted will display a field to insert information that will be named "Insert ID". The password will be inserted on the Trusted in the "insert ID" field—malware will identify it as ID. On the Legacy, the user will insert a "seeded password" (a forged password that will allow for the detection of hacking attempts)

The values inserted by the user on the trusted system may be further masked/altered as described in details hereafter.

A person skilled in the art would not just be able to follow the instructions. The innovation allows for further instances of implementation that may be envisioned by any person skilled in the art.

2. Shared Knowledge Between the User and the Secured Site

The security of communication utilizing two off-the-shelf Legacy computing systems may be further enhanced by taking advantage of the information shared by the user (or machine) and the Secured site.

The following discussion is true for sensitive information in general though the example will use a password.

Sensitive information may be a Password, ID character string, account number, social security number, credit card, encryption/decryption codes, addresses (physical and email), and even plain text.

To take advantage of the combined computing system the user is required to follow a procedure and implement methods that are designed to defeat malware and lead to detection of its presence.

Rules exercised by the user (or machine) allow for the controlled construction of character strings that contain the sensitive information. The rules may be changed from session to session and even from use/action to the next. For example, "rule x" is used to share an ID value between the user and the Secured site, and then "rule y" is used to share the password.

Rules messages may be embedded in the communication between the Secured site and displayed on the Legacy system. If communication between the user's two computing systems, in use for connecting the user to the Secured site, is avoided or communication with the hacker is prevented, the communication will be secured even if both computing systems are infected with malware.

If the above assumption cannot be made, and both Trusted and Legacy computing systems are infected by malware and communication between the systems or a hacker expose the rule selection messages, then a third computing system may be used by the user to communicate rules between the user and the Secured site. This third element is used ONLY to support out-of-band single-site limited communication. Rules may be initiated from this computer or selected by the user or a Secured site could be the source.

Examples of Rules:
- a. The password is embedded by the user into a random list of characters of which none include the password characters.
- b. Password keyed on the Trusted computing system, to be communicated to the Secure site, is embedded into a list of characters displayed on the Legacy computing system, provided by the Secured—in order or any modified order.
- c. Use of part of the password.
- d. Two or more portions of the password are delivered in two or more actions, as defined by the rule.

3. Use of Multiple Computers

There are cases in which the use of more than two computers to support a single session.

One such case was mentioned in the previous discussion, demonstrating the strengthening of security in the presence (or risk of presence) of malware in both the Trusted and Legacy systems used for the communication to the Secured site.

To link another computer to an existing paired group (could be of any number of computing systems), a pairing request is sent for this computer to the Secured site. The secured site then sends a code (a character string) to the requesting computer. The user then keys this code to one of the computers in the group with a message to the Secured site that this is a response to a pairing request. The Secured site getting this code matches it with the code sent to the requesting computing system.

A session supported by multiple computers may be serving a single user where each computing system may serve specific functions and any person skilled in the art might find various use of this capability to achieve the desired functionality.

The multiple computing systems may serve multiple users, each communicating to the Secured site with multiple computing systems to achieve superior secure communication to just a single computing system for each user. These users are not collocated and communication between them will allow for establishing the pairing of their systems.

Worth noting that this includes the simple case for peer-to-peer communication of two users, each using a single computer. This case suffers from a vulnerability, and malware infecting the computing systems poses a risk to the user's communication.

Contrary to existing solutions of similar "pairing", no modifications are required to the computing systems—the Secured site is accessed by a legacy browser, and the communication, receiving displays, and sending responses use the legacy browser.

This feature will support secure communication between two users (peer to peer), each using two or three computing systems, to allow safe exchange even in the presence of malware.

As discussed before, different rules will support different levels of security to be exercised by different systems and even for each exchange.

Each user may use three computing systems for highly secured communication—Trusted, Legacy, and Validating/Rules computing systems.

This could be even implemented in larger arrangements where a manager or system-administrator pairs and communicates with a large group of users to allow/approve actions, over the network (corporate, government . . . )—access to data, retrieve data, store data, modify data . . . .

When pairing multiple users, each one of them may use groups of computing to his likening—one, two, three, or more.

4. Hardware Advantage

The above discussion is focused on the use of off-the-shelf legacy systems which are prone and vulnerable, could be infected by malware, and pose a risk to the user. As a result, multiple computers are used to assure secure operation even if the systems are infected with malware.

This requires the user to follow strict procedures to protect sensitive information such as passwords.

With hardware components added to the computing system, the security is greatly enhanced allowing for the use of a single Legacy computing system secure use and access to the Secured site. Previous patents discuss in great detail such secure use of a Legacy computing system hardened by adding a Trusted computing element.

The hardware will simplify usage and minimize training for the user thus improving greatly the reliability of the solution.

5. No Reputable

With the user assuming control of his security comes responsibility. Since the user authorizes the operations it will be hard for him to blame "malware" or "hacker" for mishaps. The user will not be in a position to repudiate the results of his actions.

6. Secured Site Additional Services

The Secured site could provide services—store and retrieve data, email, messaging, exchange of sensitive information, secured apps—word, excel . . . .

7. Display to Defeat Malware

To securely retrieve data sophisticated means may be employed to avoid exposure of content to malware—CAPTCHA means, multiple split frames, split information display . . . .

By incorporating misleading messages the malware and the hacker would be defeated and prevented from accessing or understanding the actual intended information.

As mentioned, the Secured site will collect seeded information (information marked for detection provided to the malware/hacker) and will exercise it to detect hacking attempts in real time. For a hacker, it means while all the proxies he uses are still in place allowing for ease of tracing and tracking him down.

8. Example of Combining Features:

The following is combining 3 features—

1. 3 computers pairing
2. Rules
3. Remote communication

A corporate administrator using a third computer will authenticate a vendor accessing the corporate network by using his computer as a third computer paired with a vendor's two computers that may be infected with malware.

The computers may be paired in advance and a single administrator may be paired with numerous couples, authenticating their users as they access the corporate network.

A combination of Rules may be used to avoid detection and exposure of sensitive information to even sophisticated malware that infected communication between the two vendor's computers.

9. Distributed Secured Site

To further evade malware attacks by infected computing systems used to access the Secured Site the site may be structured as a distributed entity where the Trusted Computer access one site, the Legacy Computer access another site (two different not related URLs) and both sites are communicating with a third site the combines the session into one user session.

Following is an example of use that could be expanded by any person skilled in the art to defeat malware—one computer, Legacy, is used for displaying messages received from one site (with or without guards), and the response is made utilizing the trusted environment to another site—the use of different URLs will confuse malware infecting a computer and attempts to access a site will expose the malware that will not adhere to the strict protocol for communication.

A more sophisticated implementation will take advantage of multiple URLs that are changed from session to session making it harder for malware to recognize the use of secured access.

The possibilities are unlimited and it is up to a person skilled in the art to decide the level of desired security based on complexity, cost, and other considerations.

Following are examples that demonstrate the benefits of this application of the secured architecture innovative approach of which any person skilled in the art would find other variants to gain secure user communications with sites when faced with different challenges. The examples are designed to defeat cases where the two computers used are infected with malware:

Example 1

Secured authentication—using the Trusted device the user request communication with the Secured site utilizing a preset URL1. The site sends a URL2 and CODE/PASSWORD to the Trusted device for the user to connect. The user communicates (connects) to URL2 with the Legacy device and responds to a request for the CODE/PASSWORD with the CODE/PASSWORD. The Secured site receives the CODE/PASSWORD from the URL2 site and matches it to the CODE/PASSWORD sent to the Trusted device via URL1, to pair the user's Trusted and Legacy devices. The Secured site sends a request for account login to the Legacy device with guard strings via URL2. The user, adds the guard strings to the response sent via URL1 to the Secured site utilizing the Trusted device. At this stage, the Secured site communicates with the AUTHENTICATED user. Worth noting the URLs may be modified during the communication to further "confuse" hacking attempts. The only way for this technique to fail is if the two infected (Trusted and Legacy) devices allow malware collaboration in the combined session (Trusted and Legacy with the Secured Site(s))

Example 2: Secure Payment

After logging into the Secured Site, securing the payment will be achieved by queries present utilizing the Legacy computing system—such as requests for the source account number, target account number, amount to be paid or transferred, and others. Response to the queries will be made utilizing the Trusted computing system. The queries presented on the Legacy computing systems could include Guard strings to be added to the responses made by the user utilizing the Trusted computing system. The use of one system for queries on one system and Masked responses on a second will make it extremely difficult to be mimicked, particularly if a Secured site will be constructed as a distributed entity—meaning: several servers will include components of the Secured site, each one implementing a portion of the process—as an example: one site communicates with the user to establish a session, second generates and sends queries to with a copy to a fourth site. The responses are received on a third site and then removing the Masking on the fourth site by comparing queries, which include guard strings, to responses.

Example 3: Defeat Ransomware

Ransomware may take various shapes from capturing files to disabling operations. In this utilization of the innovation, the use of a distributed site implementation will allow any person skilled in the art to adopt the approach to various needs of securing networked computing systems susceptible to malware infection.

The specific goal of this application of innovation is to protect the cloud storage of backup or sensitive information from being accessed by malware infecting the user systems (Legacy and Trusted).

First, the authentication is carried out as described above in the first example.

As in the previous example, queries will be presented to the user on the Legacy computing system while the user will respond utilizing the Trusted computing system.

The Legacy queries may include guarding character strings that will allow the user to mask responses sent utilizing the Trusted.

The user may respond to the queries utilizing the Legacy with SEEDED responses that will allow the detection of infected systems if those character strings are used.

Responses from the systems may be recorded by the Secured site for future monitoring and detection of hacking attempts.

The communication of the user with the Secured site will allow:

1. Upload files to Private or Public storage
2. The information may be encrypted
3. Encrypted information will be stored with File names modified to avoid recognition of user-specific information by accessing the storage of the files of the Secured site by their name.
4. The file selected by the user will be uploaded from the Legacy computing system to the Secured site. The file name, masked, will be sent to the Secured site utilizing the Trusted computing system.
5. Sever 1 of the Secured site will unmask the file name and send it to Sever 2 program/server.
6. Server 2 program/server will HASH the file name and send it to be stored in Server 3.
7. Server 3 will maintain the list of HASHES and deliver it to Server 4, which will store the file sent from the Legacy system to Server 1 of the Secured site under that HASH of the file name for future access.

It is important to understand that nowhere the original file name is stored in the Secured site.

To further protect file names a code may be added to the file name before hashing thus getting the file name at the Legacy computing system will not compute the HASH stored by the Secured site. In such cases the file names reference to the code may be maintained in one of the servers or addressed in a sophisticated way.

Worth noting that this way privacy is greatly enhanced as well.

10. Authentication Services

The Secured site may be used as a front for collaborating sites (such sites could be: PayPal, Google, Facebook, Microsoft, and others.) to support not just secured authentication for specific actions—exchange of sensitive information such as credit card numbers, encryption codes, crypto money, email addresses, social security numbers, short text messages . . . .

Supporting Secured Devices

The Secured site could be also designed to support secured devices such as USB sticks, Credit cards for factor operating via smartphone hotspot, PCIe card integrated with a PC, and a Secured Computer designed with at least two environments one Trusted and one Legacy on the motherboard.

For any person skilled in the art the terminology used is clear.

11. Two Browsers (or More) on the Same Computer

A user may prefer to communicate with a single computer to the Secured Site, taking the risk that a mostly sophisticated malware could compromise his actions.

The user may use two different instances of browsers (such as Edge from Microsoft and Chrome from Google) to access the Secured Site.

The Secured Site will refer to one as Trusted and the Second as Legacy. More browsers from the same computer may be communicated to the Secured Site as Legacy devices.

The Secured Site will, conceptually, communicate messages to the user via one browser, preferred the Legacy, and display to the user or use voice or video information.

The responses, usually made by the Trusted, could be by text, clicks, voice, or video.

A person skilled in the art would take advantage of creating variations that will enhance security by incorporating means as described in other sections of this specification or of the patent or other patents.

12. Interface to Hardware Securing Means

The Secured Site may be designed to support various structures of Secured Computing systems which include Trusted and Legacy(s) computing environments/elements.

Examples of such a user system may be a keyboard connected to the user Legacy Computing system with a USB stick as described in other patents where the USB stick serves as the Trusted computing system, another embodiment of the user may be a Credit Card form factor that communicates via Bluetooth to a smartphone and via the hotspot, supported by the smartphone, to the Internet.

The user system may be a Legacy PC in which a PCIe card provides the Trusted Computing element/environment or a new type of PC designed with two environments—Legacy and Trusted.

Any person skilled in the art could design a user's computing systems to meet the requirements of security as set forth by him.

13. Third-Party Applications

The Secured Site may be designed to support third-party applications that may be integrated into the Secured Site as Add-Ons or operate as extensions on other servers.

The applications will support features that will enhance the secure operation and use of the user's computing system.

Examples of such applications could be—office applications: word processing, spreadsheet, presentation, and more. Email, texting, or conferencing to secure communications between users.

Any person skilled in the art will fit applications to support various secured applications to take advantage of specific features of the new secured computing architecture.

14. Machine to Machine

The technique suggested here may be extended to secure two machines' communication.

The Trusted element/computing system may be an off-the-shelf computing device or a dedicated hardware device.

The communication between the Trusted elements is secured since only the Legacy system contains programs that are updated/upgraded over the network.

Functions carried by the Trusted element could be but are not limited to—authentication of machines, maintaining sessions integrity, validating content delivery, encryption and hashing, and with the proper design allowing the Trusted to refresh Legacy programs and other functions that any person skilled in the art could fit and utilize by means of the Trusted element/computing-system.

Utilizing encryption and hashing could protect IDs, support authentication, maintain data integrity, and even validate the content and allow for secure communication delivering safely sensitive information or avoiding alteration of information (such as sensors' measurements or actuators' commands.

15. Catching the Hacker

By the use of the messages sent by the two different computing systems to the Secured Site, also being different from the sensitive information the user communicates to the Secured Site, seeded information is created, information that if used will allow to detect of the infected system and based on the specific seeded information used, determine which of the computing systems is infected—the Trusted or the Legacy.

For example—The password is only known to the user and the secured site. The password with the guard strings, provided by the Legacy computing system, is sent from the Trusted computing system with the password embedded. The user response with the Legacy computing system, to avoid suspicious malware of an out-of-band communication by the user to the Secured Site, a "seededpassword", the guard character strings with embedded seeded password. Future use of the passwords with the guarding character strings will indicate—system and time—Guard strings with passwords indicate a Trusted computing system infected with malware and guard strings with seeded passwords will indicate a Legacy computing system infected with malware.

16. Two Separate Channels

Worth noting—The communication of the Trusted or Legacy system does not need to use the same access, such as WiFi. The Trusted may be a smartphone using cellular communication to access the Secured site while the Legacy is using a home WiFi wireless network. Any person skilled in the art understands that the communication may be by any means to access the Secured Site, even a physical LAN (Local Area Network) to which the Legacy is connected. It is also obvious that the use of the communication channel may be the other way—the Trusted computing system communicates via LAN or WiFi and the Legacy computing system via the Hotspot of a cellular smartphone.

17. Accessing the Secured Site

Worth noting that access to the Secured site may be directly or through proxies, allowing a staggered and layered operation to SECURE a distributed structure of the Secured Site. A Front Site—communicates directly with the user. The Front Site is communicating with other sites and programs to carry out specific functions—thus avoiding a Single Point of attack.

18. Content Validation

This could be implemented in case of two computers communicating with the Secured Site but it is straight forward when the Trusted computing system is implemented as a separate Hardware device to create an out-of-band channel.

How it works—demonstrated for a document in the cloud, hosted by a Secured Site, accessed and edited by multiple users. Malware infecting a Legacy computing system may access the document and attempt to modify the document.

All modifications to the document may be carried out only via the out-of-band channel, meaning the Trusted computing system. Malware that resides in the Legacy attempting to modify the document will be exposed by the Secured Site, comparing the information communicated from the Trusted via the out-of-band channel to the information communicated by the malware.

The action by the Secured has two facets—one blocking changes attempted by malware and second detecting the presence of the Legacy infected by malware. Thus content validation.

19. Sharing Documents

Documents and files may be shared securely between users by switching Trusted and Legacy computing systems between users.

Example: User 1 and user 2 create a shared environment in the Secured Site where the secured site allow both user to login securely to access the same storage. Such shared storage is enabled by the design of the Secured Site.

User 1 wants to share securely a document with user 2—he stores the document in the private section of the memory accessing it as Trusted computing system.

User 2 access than the Secured Site with his computing system as a Trusted computing system and retrieved the user 1 document from the private section.

The design of the Secured Site will support multiple users sharing a private storage on the WWW with a mode that will allow multiple login devices where a single or multiple users will have the admin rights to allow multiple logins with different user ID and passwords.

The Secured Site may record access activities to for monitoring the access activities per user.

The sharing of the access may be implemented by having user 1 accessing with his system first, securely, as Trusted and User 2 as Legacy and then switch user 2 Legacy system to be a Trusted while implementing a secure access of user 2.

Any person skilled in the art could find varieties of ways to implement securely access and switch of admin rights as he finds fit for his specific case.

20. Supporting VPN

Virtual Private Network (PVN) are a means communication between users attempting to maintain private communication. Infiltration of such systems could be very harmful to participant in the network.

Authentication, session integrity, and content validation are mandatory to protect users from malicious systems (infected with malware or hackers) participants.

The suggested structure with Secured Site as star network, will be very advantageous for user in the phases of:
1. Joining the VPN, authentication of users securely will defeat hackers attempting to participate in the VPN.
2. Information shared by users will not be altered and attempts by malware, infecting the user computing system, to do so will instantaneously expose their presence in the user system.
3. Users will be able to validate content shared with others to assure the authenticity of the shared information.

Any person skilled in the art will be able to create modifications to the implementation to fit his specific needs as related to the number of participants, the type of computing systems used, level of privacy and security desired, and so on.

21. The Secured Site Communicates with the User

The Secured Site could share securely messages in various ways.

An example, that every person skilled in the art will know how to manipulate to implement it in various ways, is detailed hereafter.

The Secured site will send a Mask (characters that serve as a mask are sent to one computing device while the message to be secured is sent with the mask to the other computing device.

The Mask could be marked as such (a message to the user describing it as a MASK). Malware infecting this computing device will have access ONLY to the Mask.

The message on the second computing device—Sensitive message with Mask—will not indicate the content so Malware will not identify it as an important piece of information.

The user viewing both messages will unmask the message sent to the other computer (remove the Mask from the combined message) and uncover the Sensitive information intended by the Secured Site to the user.

22. Flexible User Communication Utilizing the Legacy Systems

The user communicating with a secured site may receive information on a legacy computing system (could be referred to also as just site, network node, service site and so on as the context of the writing refers to and will be cleared to any person skilled in the art) in various forms—text, voice, image, video . . . —where authentication is involved—biometric, knowledge of user, and even token. The communication may be split with sessions over multiple system and being bidirectional could serve as means to protect sensitive information and deceive malware at the same time.

By initiating secured actions by the secured site (such as messages or images) the site could create processes and responses by the legacy computing system that will authenticate the user and/or expose malware presence in the legacy computing system utilized by the user to communicate to the secured site.

23. The Site Traps Malware

The site could be configured to mimic (kind of sand box) sites and communication to trap malware to act and being exposed.

As example: The secured site will display a bank page on the user's legacy computing system, (emulate it—not a real one) follow a login process and then display an account number with the amount. Malware might attempt to modify the account number and amount, thus exposing its existence in the legacy computing system.

Any person skilled in the art could implement other use cases to trap malware.

24. Identifying Secured Systems and/or Frequently Used System

The secured site or the user will have an option to mark the systems by installing an ID number. For some add on devices, such as USB stick or Credit Card form factor, such ID numbers may be installed during the manufacturing or factory test/setup process.

25. Artificial Intelligence (AI) and ML (Machine Learning)

The site may employ a range of AI/ML means to profile users—behavior, typical usage, access . . . —to optimize the site operation and improve user experiences. Bots will allow for efficient and human error free operation. Any person skilled in the art knows how to employ and take advantage of such tools.

The same means will be used to profile and detect malware. Bots will be employed to trap malware and respond effectively to hacking attempts.

26. Files Hashing

To protect files, hashing will be used for file names and file content to avoid tracing of users documents in stored environments—in cloud or memory devices.

Example of possible use—the document resides in the Legacy environment. The document name is managed by the Trusted environment. Combining the two is made in the secured site where the hashed forms of the document and the document name are stored.

If the secured site serves as a backup (as example as means to defeat ransomware) the hashed forms will be used to access the stored documents or encrypted forms of the documents.

Persons skilled in the art could devise various methods to take advantage of this idea.

27. Documents Validation

By using the trusted environment to input a document content in the secured site and the Legacy for displaying the document from the secured site, malware infecting any of the systems or even both, will not be able to modify the content without the secured site detecting such attempts.

The user will be in a position to validate the document displayed by means of the Legacy computing system, by comparing the document that was keyed by means of the Trusted computing system.

Attempts of malware to modify the document content will be detected by the Secured site or the user.

Other configurations may be envisioned, by persons skilled in the art as related to the basic concept described, of separating "input" (to secured site) from one system from "output" (from secured site) to another system.

An implementation may take advantage of more complicated structure of user end systems where multiple computing devices are used by a user to conduct a session or the order is changed.

Implementations where a document communication is split and spliced between more than two session is possible for enhancing the secure delivery of a document or retrieving a document.

The claims

For 1:

A method where communication with a site—a program allowing communication with a browser of a computing device or direct communication with dedicated custom designs adhering to the network protocols.

The site is hosted (running as a program) on a computer system which is typically called a server, which is a node of a network.

The site hosted by the network node is configured to establish communication with multiple computing systems to carry a single session for the user by implementing a pairing function that could be implemented in one embodiment by sharing a code/character-string between the multiple computing systems, where a computing system is identified as participating in a session by receiving or sending the code to the site hosted by a network node.

The site employs means to support a user's single session using multiple computing devices (could be termed—computing systems, or legacy computing systems . . . ).

The session is split into sub-sessions, each executed by one of the multiple computing devices.

The split of the session secures it by preventing malware from having access to the session information as a whole and also allowing for masking sensitive information.

By displaying on one computing device one portion of the session, such as a request for a password, and the response is made on another computing device with the password (which could be masked) without providing the type of information that is keyed on the second computing device will not allow the malware infecting the first computing device to have access to the sensitive information (password) or malware infecting the second computing device from identifying what information is the sensitive information (password).

The site is configured to support a range of security functions—splitting a session into sub-sessions accessible by only one computing system, splitting questions and answers between sub sessions, masking sensitive information, evaluating of information by the site to authenticate users, maintaining a whole session integrity, validate content of information, detect malware presence and action before damage, detecting hacking attempts in real-time while proxies in place.

This way the data integrity and confidentiality are maintained—segregating and avoiding eavesdropping.

All the actions taken are restricting and limiting malware's access to sensitive information—as a result the integrity of overall communication between the user and the secured site (hosted by the network node) is safeguarded across all multiple computing systems.

For 2:

Masking is utilized to guard sensitive information. First computing device displays a mask sent to the user by the secured site hosted by a network node. The user responds by responding with the sensitive information integrated with the mask by means of a second computing device.

Any person skilled in the art may implement it various ways, such as adding the guarding characters to the sensitive character strings or numerically adding it. Other techniques may be incorporated where instructions how to do it may be also displayed by the first computing device.

The extraction of the sensitive information from the message the user communicates to the secured site is carried out by the site to retrieve the sensitive information.

For 3:

The first computing device may send seeded data integrated with a mask. The secured site evaluates the information received from the first computing device extracting the seeded information and storing it for detecting hacking attempts.

The sensitive information is retrieved from the second computing device message to the secured site.

For 4:

The secured site configured to evaluate messages received from the multiple computing devices the user utilize to communicate with the secured site hosted by the network node and detect malware presence in computing devices.

By comparing information received from the multiple computing devices utilized by the user the secured site determines if expected information was altered, thus indicating the presence of malware.

Attempts to access site services by using seeded information will indicate hacking attempt and reaction before damage on first attempts while hackers proxies are active.

For 5:

By the user utilizing more than two computing devices to communicate with a secured site hosted by a network node further secure communication is supported defeating malware and trapping malware to expose its existence.

For 6:

The secured site could support secured communication between remote users by pairing computing devices used by multiple users.

The secured site could provide combined services for the multiple users for sharing cloud storage with public and private storage organized in a sophisticated way.

The secured site could serve as a proxy to other sites or sharing a VPN.

For 7:

The method described in claim 1 is implemented as a solution of a secured site hosted by a network node configured to provide the functionality and services as outlined in claims 1 to 6.

General Comments

A person skilled in the art will understand the common and different uses of terminology and applications possible given the details.

It is understood that such techniques may be used and incorporated with systems that include secured hardware elements, such as USB devices or wireless credit card form factor, as described in other patents of the author of this patent.

It is understood that the use of terms "Secured site" or "service computing system" are interchangeable.

It is understood that the use of terms "guard" or "mask" are interchangeable.

It is understood that "guarding" as described in FIG. 9 is interchangeable with "masking". Inserting a character string between two guarding character strings Guard1 and Guard2 is interchangeable with "sensitive information integrated with mask".

It is understood that Trusted Computing System 101 or Legacy Computing System 102 may be referred to as a "computing system", as referred to in the claims, as a "first computing system" or "second computing system". These also may be referred to as Trusted systems or Legacy systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate by the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participates in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Many modifications and variations can be apparent to those of ordinary skill in the art without departing from the scope and spirit of the invention. Exemplary embodiments were chosen and described to best explain the principles of the present technology and its practical application and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for secure communication with a network node hosting a site by utilizing multiple computing devices, comprising the steps of:

configuring the site of the network node hosting the site to enable a user secured communication session by utilizing the multiple computing devices;

initiating the multiple computing devices and managing communication sessions between the user and the network node hosting the site;

utilizing multiple computing devices by the user to establish secure communication channels with the network node hosting the site;

splitting a session initiated by the user with the site of the network node hosting a site into multiple distinct sessions, where each session is carried out by one of the multiple computing devices used by the user to support a single session with the site of the network node hosting a site;

ensuring secure transmission of messages between each of the user's multiple computing devices and the network node hosting the site, maintaining data confidentiality and integrity during transmission by segregating and avoiding eavesdropping of the user communication of a combined session; and implementing a security mechanism that, in the event of malware infecting a computing device of the multiple computing devices utilized by the user, restricts the malware's access to only a portion of the user's session on the infected computing device, thereby safeguarding the integrity of the overall communication between the user and the site of the network node hosting a site across the multiple computing devices.

2. The method according to claim 1, further comprises the steps:

establishing communication between the multiple computing devices and the network node hosting a site, wherein said communication involves the utilization of a masking technique;

transmitting at least one mask from the network node hosting the site to a first computing device over the network;

integrating sensitive information with the transmitted mask to the first computing device by the user by means of a second computing device;

transmitting the integrated sensitive information with the mask from the second computing device to the network node hosting the site, using the second computing device, thereby preventing exposure of the sensitive information to malware that may infect the second computing device while preventing access by the first computing device to the integrated sensitive information; and extracting the sensitive information at the network node hosting the site by removing the mask sent to the first computing device from the integrated sensitive information received from the second computing device.

3. The method according to claim 1 further comprises:

validating the operation at the network node hosting the site configured to carry out such operation by:

evaluating messages received from a first computing device, wherein the mask is integrated with seeded information;

evaluating messages received from the second computing system, wherein sensitive information is integrated with the mask; and retrieving the sensitive information on the site and storing the seeded message for detection of hacking attempts.

4. The method according to claim 1, wherein the site of the network node hosting the site is configured to detect hacking attempts by:

identifying messages that include messages received from the first computing system, where the mask is integrated with seeded information; and identifying messages that include messages received from the second computing system, where sensitive information is integrated with the mask.

5. The method according to claim 1, further comprising:

using more than two computing systems simultaneously and out-of-band communication; and hardening and further securing user communication with the site of the network node hosting the site by splitting session portions between the multiple computing devices.

6. The method according to claim 1, wherein:

at least two matched users communicate over the network with the site of the network node hosting the site;

the site of the network node hosting the site serves as a proxy; and pairing, account opening, accessibility functions, and sharing of information are applied securely between the users and the site of the network node hosting the site.

7. A site hosted by a network node, to enable secure communication with the site by a user utilizing multiple computing devices, configured:

to initiate and manage a main session by the user;

allowing for multiple computing devices to access the site and be used by the user;

each of said multiple computing devices configured to establish secure communication channels with the network node hosting the site;

splitting the main session initiated by the user into multiple distinct secondary sessions, with each of the secondary sessions handled by one of the multiple computing devices utilized by the user to support a single session with the site of the network node hosting a site;

securing transmission of messages between each of the multiple computing devices and the site hosted by the network node, ensuring data confidentiality and integrity during transmission by segregating and avoiding eavesdropping of the user communication of a combined session; and in the event of malware infecting one of the multiple computing devices utilized by the user, the malware access is restricted to only the secondary session carried by one of the multiple computing devices utilized by the user, thereby safeguarding the integrity of the overall communication between the user and the site hosted by the network node hosting a site across the multiple computing devices.

* * * * *